United States Patent
Hoekstra et al.

(10) Patent No.: US 7,550,872 B2
(45) Date of Patent: Jun. 23, 2009

(54) CURRENT SENSOR APPARATUS AND METHOD FOR UNINTERRUPTIBLE POWER SUPPLY

(75) Inventors: Fokke Hoekstra, Drachten (NL);
Robert Zijlstra, Boelenslaan (NL);
Chris van Kalken, Muralto (CH);
Rajendra Naik, Bangalore (IN);
Pradeep V, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/612,691

(22) Filed: Dec. 19, 2006

(65) Prior Publication Data

US 2008/0143187 A1 Jun. 19, 2008

(51) Int. Cl.
*H02J 7/00* (2006.01)
*H02J 9/00* (2006.01)

(52) U.S. Cl. .................................................. 307/64
(58) Field of Classification Search ............. 307/64–66, 307/48

See application file for complete search history.

(56) References Cited

U.S. PATENT DOCUMENTS

| 4,980,812 | A | 12/1990 | Johnson, Jr. et al. |
| 6,169,669 | B1 * | 1/2001 | Choudhury ............... 363/37 |
| 6,583,519 | B2 * | 6/2003 | Aberle et al. ............ 307/10.1 |
| 2002/0071292 | A1 | 6/2002 | Aihara et al. |
| 2004/0084967 | A1 * | 5/2004 | Nielsen ..................... 307/66 |

FOREIGN PATENT DOCUMENTS

WO  WO 01/11763 A  2/2001

* cited by examiner

*Primary Examiner*—Albert W Paladini
*Assistant Examiner*—Carlos Amaya
(74) *Attorney, Agent, or Firm*—Roger C. Phillips; GE Global Patent Operation

(57) ABSTRACT

A UPS has a current sensor for controlling operation of a UPS main power circuit positioned in series with the AC supply voltage so as to measure the net current used by each component connected to the UPS main power circuit. Feedback from the current sensor received by a control circuit is used to achieve unity power factor operation with the UPS. The current sensor location and operation is adaptable to both single phase and three phase operation.

8 Claims, 2 Drawing Sheets

CURRENT SENSOR APPARATUS AND METHOD FOR UNINTERRUPTIBLE POWER SUPPLY

BACKGROUND OF THE INVENTION

The field of the invention relates to current sensors for uninterruptible power supplies (UPS).

Typically, in a UPS with power factor correction, the current flowing into the frontend rectifier is made to be sinusoidal and inphase with the AC supply 12 voltage $V_i$. FIG. 1 illustrates, for example, a single-phase, boost converter-based UPS 10 which has front-end rectifier 15 wherein the current $I_i$ flowing through the input inductor $L_i$ is measured by the current sensor 20. The switch S1 is controlled so that the current through the inductor $I_i$ follows a sinusoidal shape and is in phase with the AC supply 12 voltage $V_i$. However, the configuration of the UPS circuit 10 fails to account for the non-linear current drawn by other circuits in the UPS system, such as a battery charger 18, which are connected between the AC supply 12 and current sensor 20.

U.S. Pat. No. 4,980,812 also describes a single phase UPS having a through-going neutral and power factor correction. The patented UPS achieves a unity power factor when the current through the line inductor is substantially similar to and in phase with the line voltage. However, the UPS described in U.S. Pat. No. 4,980,812 does not include any additional UPS components, such as a battery charger, connected to the source (mains) voltage. Thus, the UPS described by U.S. Pat. No. 4,980,812 also does not account for the non-linear currents of other circuits in a UPS system when attempting to improve the power factor.

Accordingly, a need exists for a UPS which is capable of operation at a unity power factor while accounting for and including elements on the UPS circuit in addition to a rectifier.

BRIEF DESCRIPTION OF THE INVENTION

In one embodiment of the invention, the placement of a current sensing device in an uninterruptible power supply (UPS) is such that the net current drawn from the AC supply is of the desired wave shape and phase with respect to the AC supply voltage. The net current drawn is the sum of the current drawn by the input rectifier and the battery charger of the UPS. In one mode of operation, the UPS is operated at unity power factor so that the current drawn from the utility is sinusoidal and in phase with the AC supply, even though the individual current components flowing through the battery charger and the input rectifier are not sinusoidal or in phase with the AC supply. The invention is applicable to three phase as well as single phase UPS circuits.

In a further embodiment of the invention, the current being drawn by the battery charger circuit and the current drawn by the main power circuit of the UPS are such that the net current is sinusoidal and in phase with the AC supply voltage.

The various features of novelty which characterize the invention are pointed out with particularity in the claims annexed to and forming a part of this disclosure. For a better understanding of the invention, its operating advantages and benefits obtained by its uses reference is made to the accompanying drawings and descriptive matter. The accompanying drawings are intended to show examples of the many forms of the invention. The drawings are not intended as showing the limits of all of the ways the invention can be made and used. Changes to and substitutions of the various components of the invention can of course be made. The invention resides as well in sub-Combinations and sub-systems of the elements described, and in methods of using them.

DETAILED DESCRIPTION OF THE INVENTION

Figure 1:
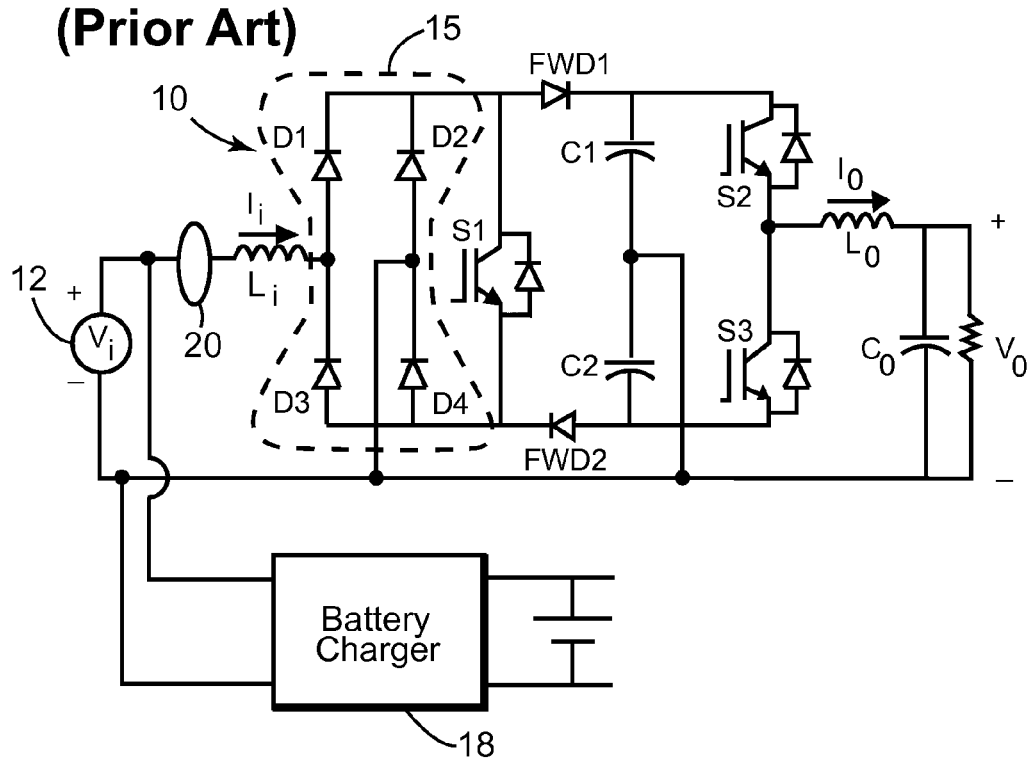
FIG. 1 is a circuit diagram of a prior art uninterruptible power supply having a current sensor.
Figure 2:
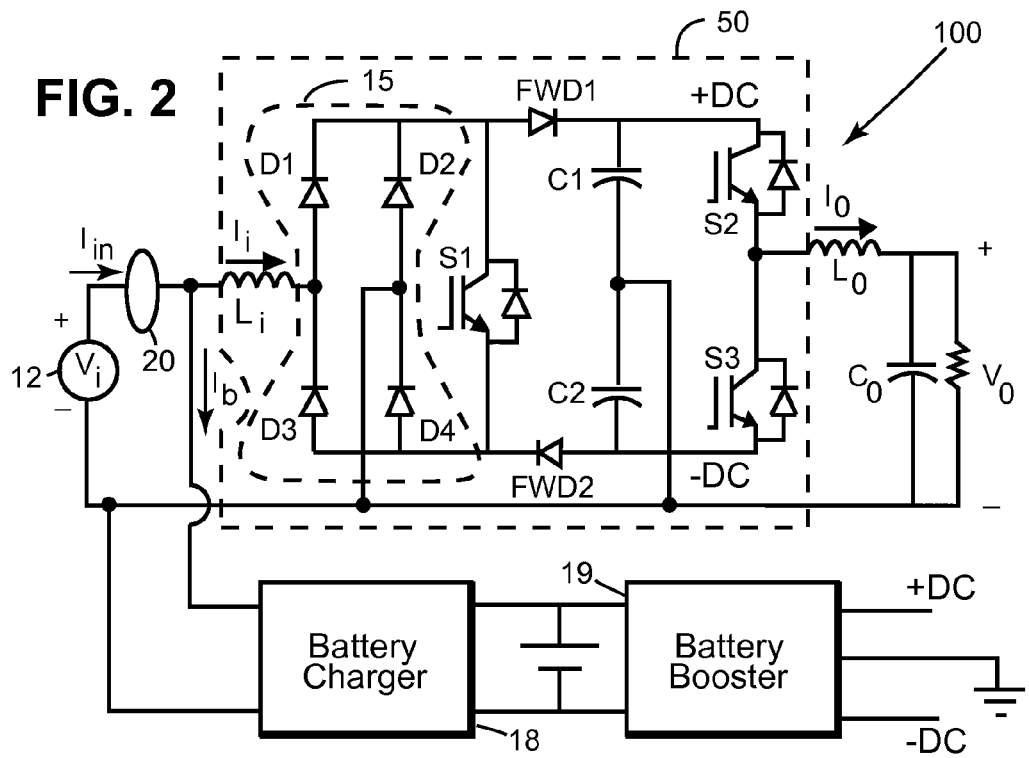
FIG. 2 is a circuit diagram of an embodiment of the present invention.

Referring now to the drawings in which like reference numerals are used to indicate the same or related elements. FIG. 2 illustrates a front end portion of a single phase UPS 100 in which battery charger 18 is connected to the AC power supply 12 in parallel with main power circuit 50. A battery booster 19 may be connected in series with the battery charger 18 if desired. Main power circuit 50 includes diode bridge 15 connected in series with boost inductor $L_i$. Boost inductor $L_i$ is in turn connected in series with the AC power supply 12.

The battery charger 18 has a conventional diode bridge front end that draws a highly distorted current. If the current through the boost inductor $L_i$ is measured and the switch S1 controlled such that the current through the inductor $L_i$ is sinusoidal and in phase with the AC power supply 12 the net supply current $I_{in}$, which is the sum of the boost inductor current $I_i$ and the battery charger current $I_b$, will not be sinusoidal and will have a slight phase shift with respect to the AC power supply 12. The battery charger 18 draws a slightly leading current due to the presence of the capacitive filter on the output of its front-end diode bridge. The various waveforms are shown in FIG. 3.

The total current $I_t$, flowing from the AC supply 12 is measured by a current sensor 20. Current sensor 20 may be a current transformer, a Hall device or a shunt resistor, or other structure which provides current measurement information. The current sensor 20 is positioned to be in series with the AC power supply 12. Accordingly, the current input to the current sensor 20 includes the current flowing through the main power circuit 50 and the battery charger 18. This measured current $I_{in}$ is used as a feedback in the current loop of the control circuit (not shown). The UPS controller circuit then forces the current $I_{in}$ through the current sensor 20 to be sinusoidal and in phase with the AC power supply voltage $V_i$ to produce unity power factor operation, such as by operation of switch S1. Switch S1 is controlled based on the feedback from the current sensor 20 such that the net current $I_{in}$, which is the sum of the boost inductor current $I_i$ and the battery charger current $I_b$, is sinusoidal and in phase with the AC power supply 12. Unity power factor operation of the UPS 100 is achieved even though the individual components of the UPS 100 do not exhibit sinusoidal currents themselves.

Figure 3:
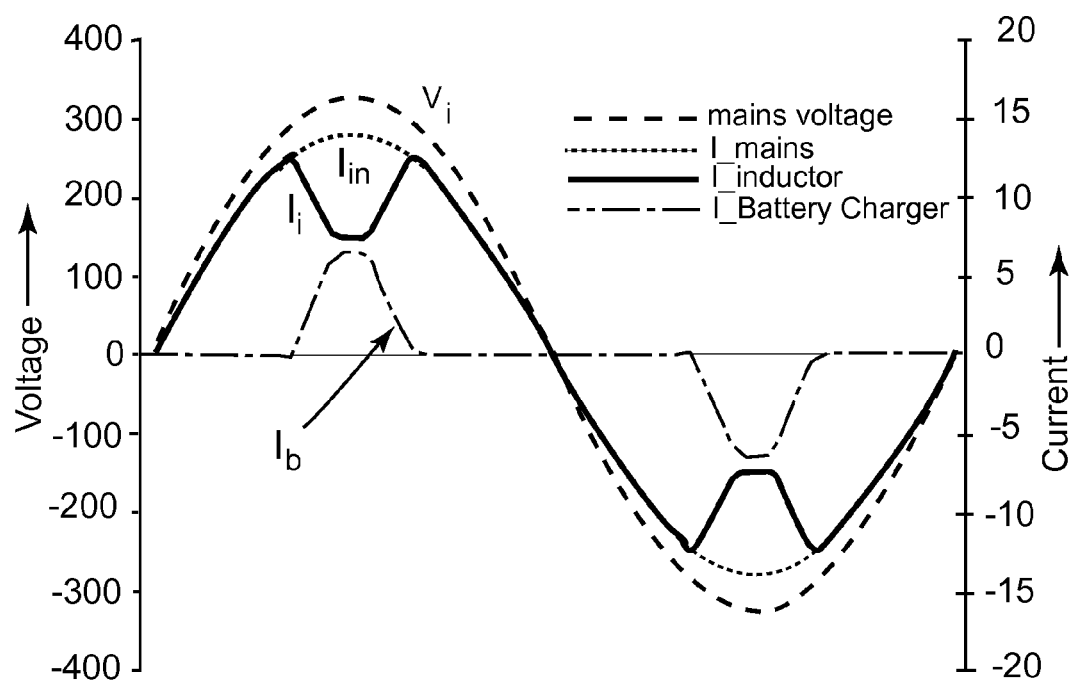
FIG. 3 is a graph of current and voltage versus time displaying representative waveforms in the circuit of FIG. 2.

The various waveforms of the input voltage and component currents are shown in FIG. 3. As illustrated in FIG. 3, mains voltage $V_i$ of the AC power supply 12 has a conventional sinusoidal waveform. $I_i$ and $I_b$ comprise the component elements of mains current $I_{in}$. As seen in FIG. 3, $I_i$ and $I_b$ are not perfectly sinusoidal, but do sum to form sinusoidal current $I_{in}$. That is, as the battery charging current $I_b$ changes from zero, $I_i$, the current through the boost inductor $L_i$, changes from sinusoidal to reflect the subtraction of the battery charging current $I_b$. As the battery charges, the current $I_b$ to the battery charger 18 reduces and the current $I_i$ to main power circuit 50 becomes substantially the same as current $I_{in}$.

As will be appreciated, moving the current sensor 20 to a position in series with the input voltage source 12 and ahead of any UPS circuit components, such as the main power circuit or an accessory circuit, ensures that the net current $I_{in}$ is in phase with the input voltage $V_i$ to provide unity power factor operation. Unity power factor operation is achieved regardless of the components connected with the UPS main power circuit 50.

While the present invention has been described with references to preferred embodiments, various changes or substitutions may be made on these embodiments by those ordinarily skilled in the art pertinent to the present invention without departing from the technical scope of the present invention. Therefore, the technical scope of the present invention encompasses not only those embodiments described above, but all that fall within the scope of the appended claims.

What is claimed is:

1. An uninterruptible power supply comprising an input power supply and a main power circuit providing a DC output voltage and being connected to the input power supply, said input power supply providing an AC voltage, wherein said uninterruptible power supply further comprises
    a current sensor connected in series between the power supply and the main power circuit and the current sensor configured to continuously sense a total current received from said input power supply; and
    at least one accessory circuit connected to receive the AC voltage from the input power supply and being connected in parallel with the main power circuit, said connection being between said current sensor and said main power circuit, said current sensor measuring the total current drawn from said input power supply and provided to said main power circuit and to said at least one accessory circuit;
    wherein said total current is in-phase with said input power supply voltage and wherein said total current received from said input power supply comprises an inductor current and an accessory circuit current.

2. An uninterruptible power supply according to claim 1 wherein the at least one accessory circuit comprises a battery charger.

3. An uninterruptible power supply according to claim 2 further comprising a battery booster connected in series with the batter charger.

4. An uninterruptible power supply according to claim 1 wherein the main power circuit includes a controlled switch and wherein the current measured by the current sensor provides feedback for controlling said switch.

5. An uninterruptible power supply according to claim 1 further comprising a boost inductor in series with the main power circuit connected to the current sensor.

6. A method of configuring an uninterruptible power supply comprising:
    providing an input power supply and a main power circuit providing a DC output voltage and being connected to the input power supply, said input power supply providing an AC voltage;
    connecting a current sensor in series between the power supply and the main power circuit to continuously sense total current received from said input power supply; and
    connecting at least one accessory circuit to receive the AC voltage from the input power supply and to be in parallel with the main power circuit, said connection being between said current sensor and said main power circuit, said current sensor measuring the total current drawn from said input power supply and provided to said main power circuit and to said at least one accessory circuit;
    wherein said total current is in-phase with said input power supply voltage and wherein said total current received from said input power supply comprises an inductor current and an accessory circuit current.

7. A method according to claim 6 which further comprises:
    connecting a controlled switch in the main power circuit to receive said current measured by the current sensor as feedback for controlling the controlled switch during operation of the uninterruptible power supply to achieve unity power factor operation.

8. A method according to claim 6 wherein the at least one accessory circuit comprises a batter charger.

* * * * *

UNITED STATES PATENT AND TRADEMARK OFFICE
CERTIFICATE OF CORRECTION

PATENT NO. : 7,550,872 B2
APPLICATION NO. : 11/612691
DATED : June 23, 2009
INVENTOR(S) : Hoekstra et al.

It is certified that error appears in the above-identified patent and that said Letters Patent is hereby corrected as shown below:

In Column 2, Line 36, delete "$I_i$," and insert -- $I_{in}$ --, therefor.

Signed and Sealed this

Fourth Day of August, 2009

JOHN DOLL
*Acting Director of the United States Patent and Trademark Office*